United States Patent
Buttner

(10) Patent No.: US 9,168,803 B2
(45) Date of Patent: Oct. 27, 2015

(54) AIR SPRING

(75) Inventor: Josef Buttner, Waldaschaff (DE)

(73) Assignee: SAF—HOLLAND GmbH, Bessenbach (DE)

( * ) Notice: Subject to any disclaimer, the term of this patent is extended or adjusted under 35 U.S.C. 154(b) by 23 days.

(21) Appl. No.: 13/822,527

(22) PCT Filed: Sep. 15, 2011

(86) PCT No.: PCT/EP2011/066042
§ 371 (c)(1),
(2), (4) Date: Mar. 12, 2013

(87) PCT Pub. No.: WO2012/035116
PCT Pub. Date: Mar. 22, 2012

(65) Prior Publication Data
US 2013/0175742 A1    Jul. 11, 2013

(30) Foreign Application Priority Data

Sep. 17, 2010   (DE) .......................... 10 2010 040 980

(51) Int. Cl.
| | | |
|---|---|---|
| F16F 9/04 | (2006.01) | |
| B60G 11/27 | (2006.01) | |
| F16F 9/05 | (2006.01) | |
| B60G 11/62 | (2006.01) | |

(52) U.S. Cl.
CPC .............. B60G 11/27 (2013.01); F16F 9/0454 (2013.01); F16F 9/05 (2013.01); F16F 9/0418 (2013.01)

(58) Field of Classification Search
CPC ................. F16F 9/00; F16F 9/02; F16F 9/04; F16F 9/0418; F16F 9/0454; F16F 9/05; F16F 9/057; B29D 22/023; B60G 11/27
USPC .............. 267/35, 64.19, 64.21, 64.23, 64.24, 267/64.27
See application file for complete search history.

(56) References Cited

U.S. PATENT DOCUMENTS

| | | | | |
|---|---|---|---|---|
| 2,536,626 | A | * | 1/1951 | Coleman ..................... 267/64.23 |
| 2,920,885 | A | | 1/1960 | Niclas |
| 3,042,393 | A | * | 7/1962 | Templeton et al. ............. 267/35 |
| 3,391,922 | A | * | 7/1968 | Axthammer ............... 267/64.17 |
| 5,954,316 | A | * | 9/1999 | Voss ........................... 267/64.27 |
| 6,234,460 | B1 | * | 5/2001 | Arnold ........................... 267/35 |

FOREIGN PATENT DOCUMENTS

| | | |
|---|---|---|
| DE | 1147127 | 4/1963 |
| DE | 4006480 | 9/1991 |
| DE | 19720776 | 11/1998 |
| DE | 19813901 | 10/1999 |
| EP | 1593873 | 11/2005 |
| FR | 1173675 | 4/1957 |
| GB | 1001515 | 8/1965 |
| GB | 1248025 | 9/1971 |

* cited by examiner

Primary Examiner — Melody Burch
(74) Attorney, Agent, or Firm — Price Heneveld LLP

(57) ABSTRACT

Air spring, in particular for a commercial vehicle, comprising a plunger piston, an air bellows, and a cover, said air bellows being movable between a first compressed position and a second extended position by a compressing or extending movement, wherein the air bellows has an axle-side region with a fixing portion for fixing on the plunger piston, and a body-side region, wherein the fixing portion is fixed between the cover and the plunger piston, and wherein the cover has at least one guiding portion on the cover circumferential edge, said guiding portion extending away from the body-side region and outwards over or beyond the fixing portion and being used as a support for the axle-side region.

13 Claims, 3 Drawing Sheets

AIR SPRING

FIELD OF THE INVENTION

The present invention relates to an air spring or pneumatic spring, in particular for a commercial vehicle.

BACKGROUND OF THE INVENTION

Conventionally, a vehicle axle of a commercial vehicle comprises an axle body which on one side by means of at least one trailing arm forms an axle assembly and therefore is movably hinged on the vehicle frame and supported relative to the vehicle frame by means of a respective air spring arranged above or behind the crossing area of the axle body and the trailing arm. The air spring in turn comprises an air bellows arranged between a cover and a base plate, wherein for a mechanical coupling between the air bellows on the one hand and the axle assembly on the other hand there is provided a plunger piston which is arranged on the air bellows. At its axle-side region the air bellows is connected to the plunger piston, wherein an outer surface of the plunger piston serves as a rolling or unfolding surface for the air bellows so that a guided movement of the air bellows is ensured during operation when the plunger piston moves up and down.

However, such air springs are to a limited extent only suitable for crane and train loading since due to the weight of the axle, which will then hang below the vehicle, the air bellows is completely extended or unfolded without further support devices so that a negative pressure is generated in the air bellows relative to its surroundings. When the vehicle is set down, there is the danger that the air bellows folds towards the inside or tilts relative to the plunger piston or folds in and, hence, does not unroll or unfold along the plunger piston, as would be normal operation, which might lead to damage.

In order to avoid this problem, conventionally in crane and train loading the range of spring of the air spring is limited by means of a tensioning or gripping device attached to the vehicle frame, or a divided plunger piston is used. Alternatively, the air spring may also be designed such that the air spring is releasably connected to the body and, in the case of crane loading of the trailer, the air spring is separated from the body by means of a returning device, and by means of the returning device the cover, and thus the bellows as well, is held in a defined position relative to the plunger piston so that the bellows unrolls or unfolds along the plunger piston or is held in an unrolled or unfolded state.

SUMMARY OF THE INVENTION

The object underlying the invention is to provide an air spring, which is in a simple manner suitable for a crane loading of vehicles.

According to the present invention there is provided an air spring, in particular of a commercial vehicle, comprising a plunger piston, an air bellows which is movable between a first compressed position and a second extended position by a compressing or extending movement, respectively, and an axle-side region with a fixing portion for fixing on the plunger piston, and a body-side region. The air spring according to the invention further comprises a cover, wherein the fixing portion is fixed between the cover and the plunger piston, and wherein the cover has at least one guiding portion at its circumferential edge, which guiding portion extends away from the body-side region and outwards beyond the fixing portion and serves as a support for the axle-side region. The guiding portion preferably lies from above on that portion of the axle-side region which is adjacent to the fixing portion, which usually is held or supported, in particular clamped, between the cover and a respective groove or bead in the upper region of the plunger piston.

This means that in case the axle-side region of the air bellows unrolls or unfolds on the outer side of the plunger piston during the compressing or extending movement, it is supported additionally by the at least one guiding portion, whereby there is provided a better control or definition of the unrolling and rolling or unfolding and folding operation of the axle-side region of the air bellows and, thus, a better and safer handling of the air spring. The upper side of the plunger piston is adjacent to the cover. The term "commercial vehicle" in the sense of the present invention is not meant to be limited to drawing vehicles such as trucks or tractors, but also the trailers or semi-trailers thereof. There are different ways of positioning the axle-side support of the air spring. The axle-side support may be a plunger piston attachment or an air spring carrier. The air spring carrier may be arranged on a suspension arm of the axle assembly, for example. The axle-side region in the sense of the present invention is the end portion of the air bellows which is connected to the axle-side support of the air spring by means of the plunger piston and, possibly, further arrangement means, i.e. the portion of the air bellows which is arranged on the plunger piston. The body-side region of the air bellows is that portion of the air bellows which is connected to the body by means of a cover and, possibly, further arrangement means. An air bellows according to the invention may be in different states. In a basic state of the air bellows, there are no external forces such as tensile or propulsive and/or shearing forces acting on the air bellows. In particular, the basic state of the air bellows is that state in which the air bellows is when the air bellows which is mounted in an air spring is once inflated using compressed air for example and then the compressed air is let off or deflated again from the air spring, i.e. inside the air spring there is again ambient pressure. In the basic state no further force is applied on the air spring after the inflation process, apart from its own weight force. The air bellows may also have different operational states. One of said operational states is for example when the air spring is arranged in conventional operation, wherein for example the internal pressure in the air bellows differs from the ambient pressure. Such an operational state is present for example when the vehicle is in conventional use. In use, as a result of compressing and extending movements, the air bellows may be moved into a first position in which it is—possibly even completely—compressed, as well as into a second position in which it is—possibly even completely—extended. Another operational state is a state in which the air bellows is deflated, for example when the device such as a trailer of a truck on which the air spring is arranged is parked over a longer period of time. In this case, there is ambient pressure inside of the air bellows, as in the basic state, and the air bellows is in the first position. In this operational state of the air bellows, the length of the air spring is regularly smaller than the length of the air spring in the basic state of the air bellows. Furthermore, the air bellows may have a loading state, wherein the loading state is present for example when the vehicle is crane-loaded onto a railway car, i.e. the axle assembly depends from the air spring. In this case the air bellows is in the second position. In the loading state of the air bellows, the air spring, when measured along its center line, is regularly longer than in the basic state of the air bellows. If a very high internal pressure is applied to the air spring in the operational state of the air bellows, it is also possible that the air spring has the same dimensions as in the loading state of the air bellows. The air bellows may also be in the basic state when it is decoupled from the plunger piston, for example, i.e. for example when the air bellows is supported alone. When a trailer on which the air spring is arranged is loaded onto a railway car, a ferry or the like, when the trailer is lifted over the chassis or the body, due to the axle weight, the air bellows is essentially completely stretched. As has already been described, the axle-side region of the air bellows is reliably rolled or folded or unrolled or unfolded due to the additional support by means of the at least one guiding portion. Consequently, at any time it is ensured that the unrolling or unfolding of the air bellows on the plunger piston functions reliably even if no pressure is applied to the air bellows. Thus, when the trailer is put down onto the railway car or onto the ferry, the air bellows is designed such that it automatically returns to the same state as before the lifting operation. This state may be the basic state, for example, when in particular the air bellows is deflated, or a state different from the basic state, when an internal pressure is applied to the air bellows for example. To put it differently, the air bellows may essentially be fully stretched during the lifting of the trailer when the trailer is loaded onto a railway car or a ferry. When the trailer is then put down on the railway car or the ferry, the air bellows unrolls or unfolds along the outside of the plunger piston even if there is only little internal pressure inside of the air bellows. Tilting or folding in of the air bellows is prevented by the at least one guiding portion of the cover. Therefore, advantageously, according to the invention it is not necessary to limit the maximum spring range during the loading operation, for example by means of an arrester cable as preferred gripping or tensioning device. In particular, it is advantageously neither necessary to design the plunger piston such that it is divided. Rather, due to the air spring according to the invention, the problems of the prior art are solved in a simple manner.

It may be advantageous if the fixing portion extends at least up to the radial outer side of the plunger piston or even beyond. This offers the advantage that the guiding of the axle-side region of the air bellows in particular in the area of the maximum extension is particularly good and precise since a particularly large contact surface and a close contact between the at least one guiding portion and the axle-side region result.

Expediently, the fixing portion of the air bellows is directed preferably diagonally downwards in each position of the air bellows. That portion of the air bellows which is positioned or guided by the fixing portion or which is adjacent to the fixing portion may be directed diagonally downwards, i.e. away from the body-side region downwards and outwards.

The guiding and support of the axle-side region of the air bellows between the at least one guiding portion and the upper side of the plunger piston is even further improved if the plunger piston has an inclined surface on its upper side, which at least partially corresponds to the at least one guiding portion. In particular, the guiding portion and the inclined surface may be designed to be essentially parallel to one another at least in certain areas.

A particularly simple embodiment of the guiding portion results when it is designed as a surface which is rotationally symmetrical relative to the axis of symmetry of the air spring. To put it differently, this means that the guiding portion is designed as a ring surface inclined downwards from the edge of the cover, for example as a lateral surface of a cone or of a truncated cone.

In an alternative embodiment, the at least one guiding portion is designed as a plurality of partial surfaces, which relative to the axis of symmetry of the air spring are arranged at the same circumferential angle distance relative to one another. The individual guiding portions are designed for example like petals of a blossom—each one with its outer edges inclined downwards, assuming a normal mounting position of the cover or of the air spring. In this context it should be noted that such an air spring usually is largely rotationally symmetrical to an axis of symmetry, which, however, does not apply to each individual component. Thus, the individual guiding portions strictly speaking are not rotationally symmetrical to the axis of symmetry.

It may be advantageous if the at least one guiding portion comprises a curveless partial portion which is arranged at an angle $\alpha$ of about 0° to 70° relative to the axis of symmetry of the air spring. Preferably, however, the angle $\alpha$ is about between 20° and 50°, wherein an angle of about 35°-45° is particularly preferred. Thus, the at least one guiding portion may be ideally adapted to the shape of the upper side of the plunger piston and be optimized with respect to its guiding and supporting properties.

It is advantageous if the at least one guiding portion extends over a range of about 10% to 40%, preferably about 15% to 35%, and in particular about 20% to 30% of the radial expansion of the plunger piston. In this way it is possible to optimize the guiding and supporting properties of the at least one guiding portion.

It may be advantageous if the cover radially within the at least one guiding portion forms an at least essentially plane surface. To put it differently, there is not provided a downwards recess in the cover, but the latter is plane.

Alternatively, the cover may be designed concavely at least in certain areas within the at least one guiding portion. Here, the curvature may extend into the air bellows. Preferably, however, the curvature is oriented from the inside of the air bellows towards its outside.

If the at least one guiding portion comprises at its radial outer end a rounding or portion which curves back towards the body-side region, said end rests particularly well and "softly", i.e. without the danger of injuries, against the axle-side region of the air bellows and guides the latter particularly well. Said properties may be even further improved if the rounding forms a chamfer which is open towards the upper side—i.e. towards the body-side region. Therefore, in this embodiment the air bellows may adapt or conform or adhere to the chamfer and is thus particularly well guided and supported.

Further advantages and features of the invention result from the following description of preferred embodiments with reference to the appended Figures, wherein individual features of individual embodiments may be combined to form new embodiments.

DETAILED DESCRIPTION

Figure 1:
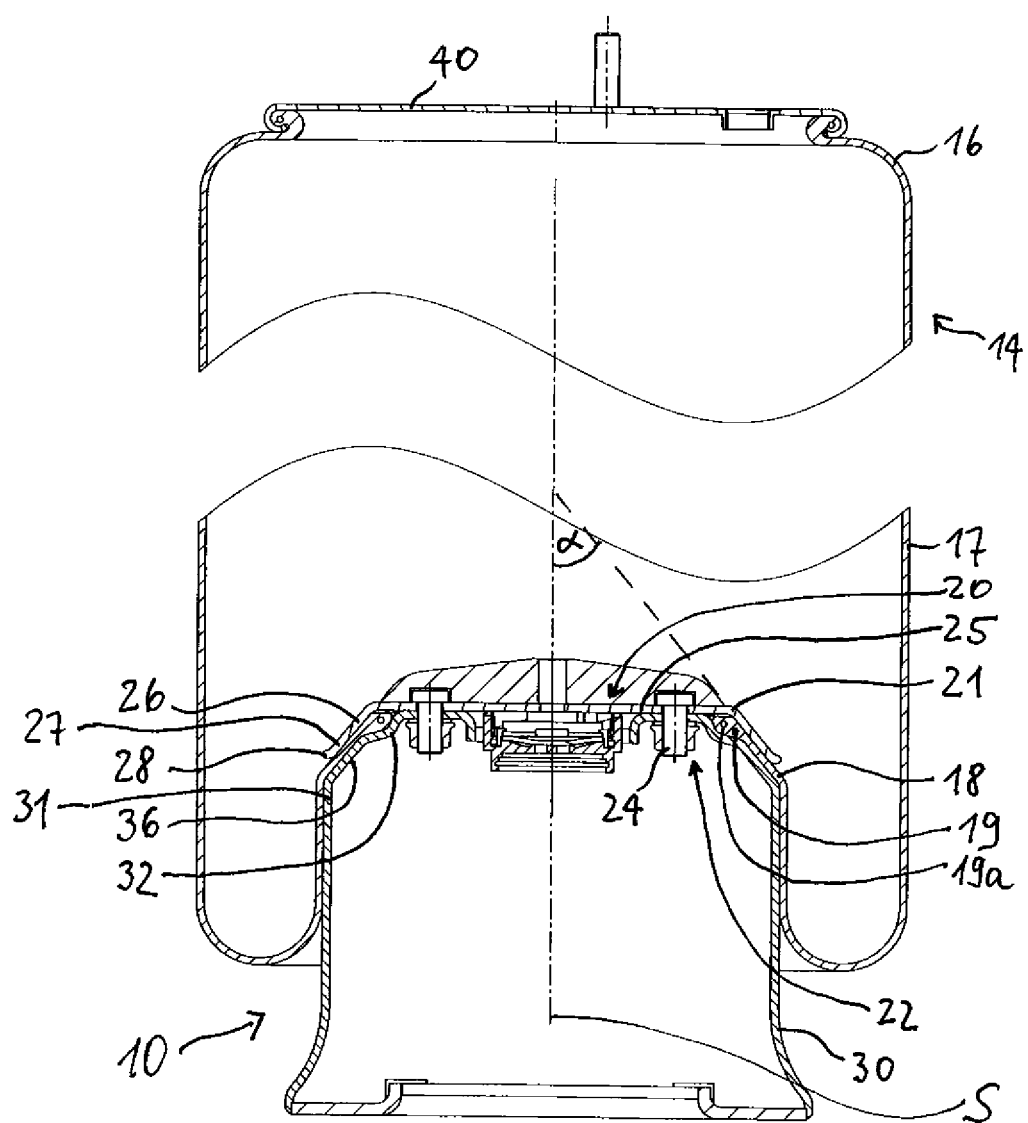
FIG. 1 a schematic sectional view of a first embodiment of the air spring according to the invention in its compressed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows an air spring 10 according to the invention. The air spring 10 comprises a plunger piston 30 as well as an air bellows 14. The plunger piston 30 may be made of any material, for example a plastic material or a metal such as steel. The air bellows comprises a body-side portion or a body-side region 16 as well as an axle-side portion or axle-side region 18. Between the axle-side region 18 and the body-side region 16 there is provided a central portion 17.

The body-side region 16 is closed by means of a cover 40. The cover 40 may be connected to a structure or body of a trailer (not shown in the Figures), for example.

The axle-side region 18 of the air bellows 14 ends in a fixing portion 19 which forms a thickened ring into which a reinforcing ring 19a is embedded. At the upper side 31 of the plunger piston 30, there is a ring bead 32 into which the fixing portion 19 is inserted. In order to close the plunger piston 30 there is placed onto its upper side 31 a cover 20, which forms a plane surface 25 in its central region.

At the circumferential edge 21 of the plane surface 25 the cover 20 continues in a guiding portion 26, which is designed in the form of a circular ring surface the outer edge of which is tilted downwards, i.e. away from the body-side region 16. To be more exact, the guiding portion 26 forms a part of a conical surface.

At the radial outer end 27 of the guiding portion 26 there adjoins a relatively slightly curved rounding 28 which is open towards the body-side region 16 and which is curved back towards the body-side region 16. The guiding portion 26 forms an angle α of about 40° to the axis of symmetry of the air spring 10. With regard to the overall radial expansion of the cover 20 the guiding portion 26 takes up about a quarter thereof, wherein the rounding 28 is not taken into account.

The arrangement is such that the fixing portion 19 and the adjacent portion of the axle-side region of the air bellows 14 comes to rest between the guiding portion 26 and an inclined surface 36 of the plunger piston 30, which inclined surface 36 is formed below the ring bead 32. Thus, the fixing portion 19 is supported or held, usually clamped, between the guiding portion 26 and the inclined surface 36. The clamping is achieved by a clamping device 22 which connects or bolts the cover 20 to the plunger piston 30 by means of fastening means 24, such as in particular bolts and nuts. Thus, a secure, however releasable, connection between the air bellows 14 and the plunger piston 30 is ensured. Otherwise, the plunger piston is of the conventional type as it is used for conventional air springs 10. The basic embodiment of the air bellows 14 is also conventional, as it is known from conventional air springs 10, wherein the air bellows 14 may be easily removed from the plunger piston 30, for example by at least partially releasing the bolts and nuts 24 and by spacing apart the clamping device 22 from the plunger piston 30. Consequently, the fixing portion 19 of the air bellows 14 is no longer clamped between the clamping device 22 and the plunger piston 30, and it is possible to remove the air bellows 14 and to replace it by a new air bellows 14.

Thus, according to the invention the axle-side region 18 of the air bellows 14 is at any time securely guided and supported or held in the neighborhood of the fixing portion 19, in particular, however, when the air bellows rolls or folds or unrolls or unfolds during a compressing or extending movement.

FIGS. 2-5 show two further advantageous embodiments of the invention. In said Figures, identical or similar parts are designated by the same or similar reference numerals, and in order to avoid repetition, they are not explained anew. The statements made with respect to the first embodiment also apply to the further embodiments, unless it is explicitly explained differently or technically unfeasible.

Figure 2:
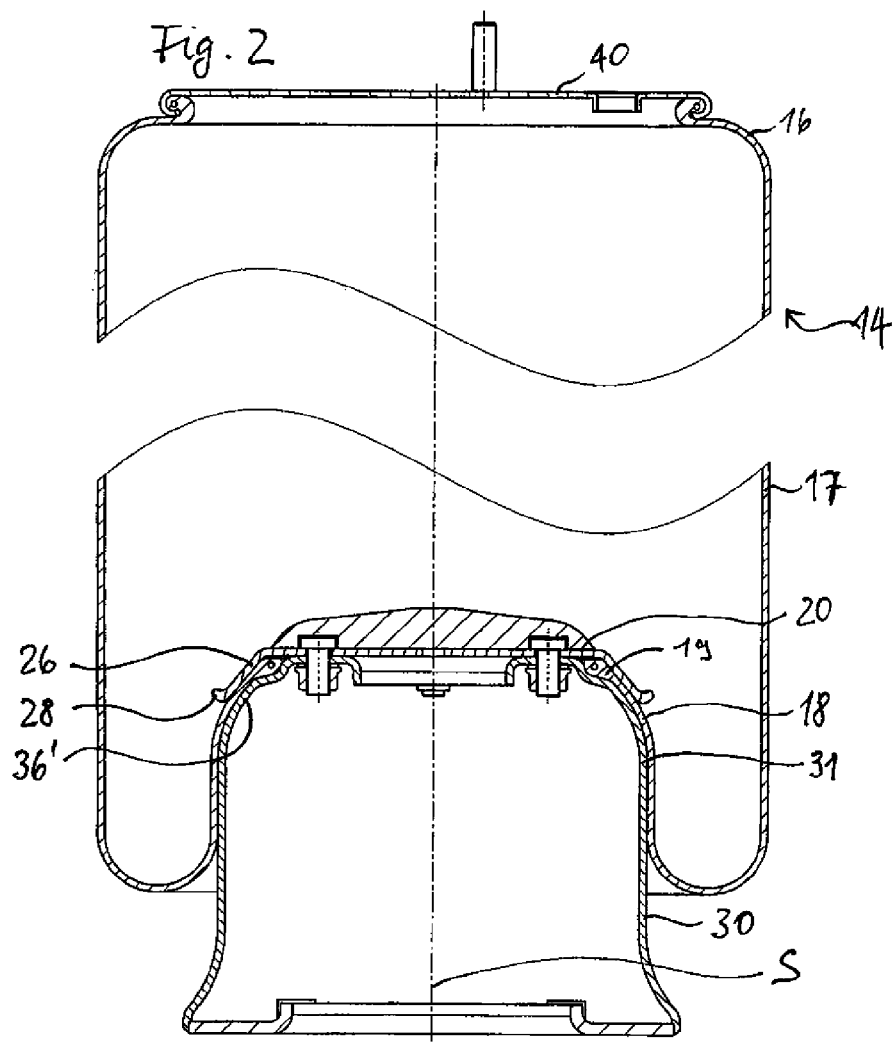
FIG. 2 a schematic sectional view of a second embodiment of the air spring according to the invention in its compressed position.
Figure 3:
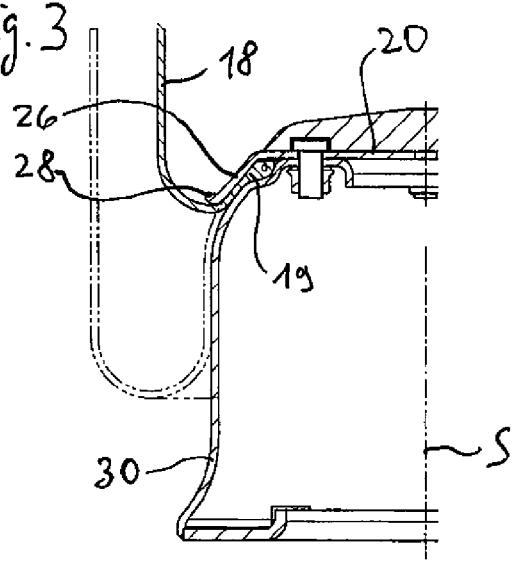
FIG. 3 a schematic sectional view of the second embodiment in its extended position.

FIGS. 2 and 3 show a second embodiment of the air spring according to the invention. The second embodiment differs from the first embodiment on the one hand in that the plunger piston 30 does not have at its upper side 31 a linear or plane inclined surface 36, as is the case in the first embodiment, but a curved surface 36' which, however, is also inclined or slant. Thus, the plunger piston 30 of this embodiment is designed like a bell at its upper side. As can be readily seen from FIGS. 1 and 2, the present invention can be used for different embodiments of plunger pistons and does not depend on a certain design of the upper side of the plunger piston. On the other hand, the second embodiment differs from the first one in that the rounding 28 adjacent to the radial outer end 27 of the guiding portion 26 is designed as a chamfer which is open towards the body-side region 16. By contrast, the respective rounding 28 of the first embodiment is considerably less curved and thus less pronounced than in the second embodiment. As can be seen from FIG. 3, which shows the air spring according to the invention in its largely extended state, the axle-side region 18 of the air bellows 14 rests closely against the rounding 28 in this state and is even better guided and supported thereby than in the first embodiment.

Figure 4:
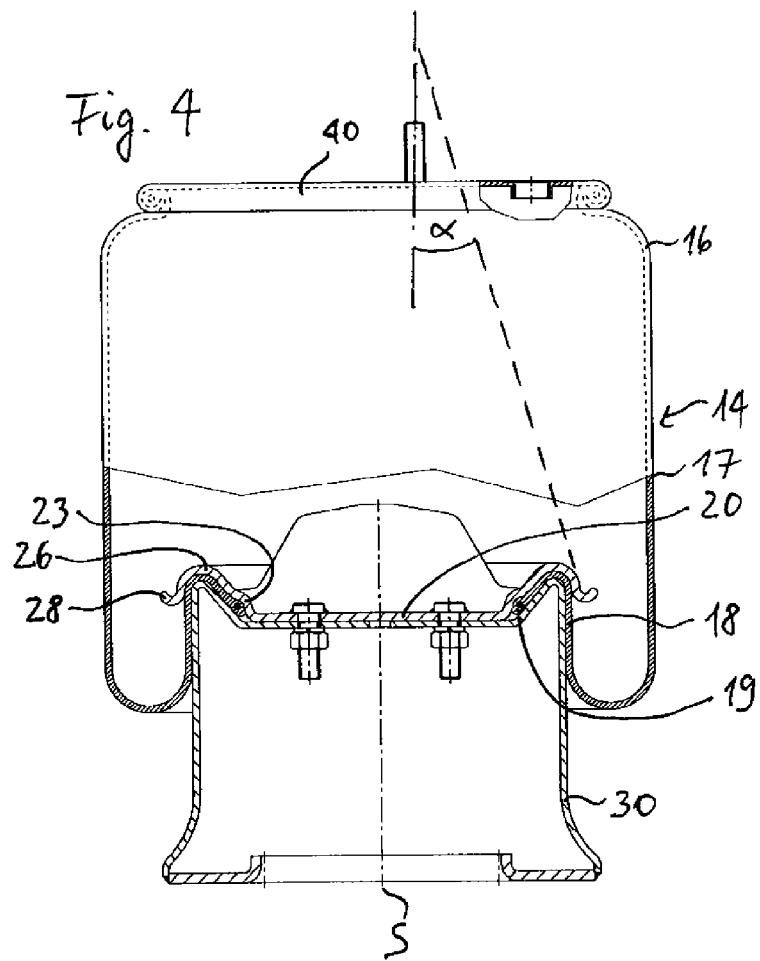
FIG. 4 a schematic sectional view of a third embodiment of the air spring according to the invention in its compressed position.
Figure 5:
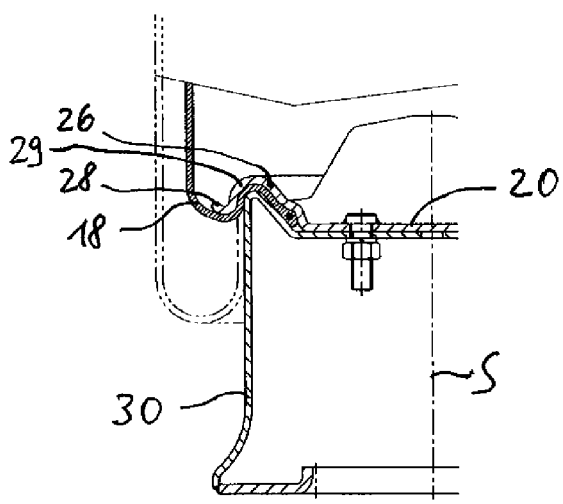
FIG. 5 a schematic sectional view of the third embodiment in its extended position.

FIGS. 4 and 5 show a third embodiment of the air spring according to the invention. Unlike in the first two embodiments the cover 20 is not designed as a plane surface 25 in its central portion, but forms a downwards recess, i.e. away from the body-side region 16. As can be seen, the guiding portion 26 extends beyond the fixing portion 19 of the axle-side region 18 and in this area radially towards the outside forms a surface ascending to the body-side region 16, which radially even further outside continues in a portion 29 which is curved away from the body-side region 16 (i.e. downwards). As a result, the plunger piston 30 is encompassed at its upper side 31, and the axle-side region 18 is particularly well supported and guided between the guiding portion 26 with the portion 29 and the upper side 31 of the axle-side region 18 of the air bellows 14. The radially outermost end of the guiding portion 26, i.e. of the portion thereof, is designed in the form of a circumferential rounding 28 in the form of a chamfer open towards the top, which is even more pronounced than in the second embodiment. As can be seen from FIG. 5, the axle-side region 18 of the air bellows 14 in the completely or almost completely extended state of the air spring 10 rests very closely and over a large surface against the bottom side of the rounding 28 and is thus securely and precisely guided and supported by the rounding 28. The diagonally downwards directed portion 29 of the guiding portion 26—i.e. that portion immediately radially within the rounding 28—is arranged very steeply and has only an angle α of about 10-20° with respect to the axis of symmetry S.

In contrast to the first two embodiments, in the third embodiment of the air spring 10 according to the invention a ring bead 23 is provided not at the upper side of the plunger piston 30, but in the cover 20, in which ring bead 23 the fixing portion 19 of the outer region 18 of the air spring 14 comes to rest.

It should be noted that according to the invention, in all embodiments, the axle-side region 18 of the air bellows 14 is at any time guided and supported or held in the neighborhood of the fixing portion 19, in particular however during the rolling or folding and unrolling or unfolding of the air bellows during a compressing or extending movement.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

The invention claimed is:

1. An air spring for a commercial vehicle, comprising:
    a plunger piston, an air bellows, and a cover;
    wherein the air bellows is movable between a first compressed position and a second extended position by compressing and extending movements, respectively;
    wherein the air bellows has an axle-side region with a fixing portion for fixing on the plunger piston, and a body-side region;
    wherein the fixing portion is fixed between the cover and the plunger piston;
    wherein the cover includes a circumferential edge having at least one guiding portion having a radial outermost end, the guiding portion extending away from the body-side region and outwards beyond the fixing portion and including a support for the axle-side region, and wherein the outward extending portion of the guiding portion ends at a rounding portion;
    wherein the fixing portion of the air bellows in the first compressed position and the second extended position of the air bellows is directed diagonally downwards;
    wherein the plunger piston includes an upper side having an inclined surface with a substantially planar portion which at least partially corresponds to the at least one guiding portion so that at least a portion of the guiding portion and the substantially planar portion of the inclined surface are at least substantially parallel to one another, and wherein the at least one guiding portion does not extend substantially directly vertically downward between the substantially planar portion and the radial outermost end and wherein the inclined the surface of the upper side of the plunger piston and the axle side region of the air bellows all extend in a diagonal downward direction past the rounding of the guiding portion; and
    wherein the at least one guiding portion includes a curveless partial portion which is arranged at a first angle of between about 20° and about 70° with respect to an axis of symmetry of the air spring.

2. The air spring of claim 1, wherein the fixing portion extends at least up to a radial outer side of the plunger piston.

3. The air spring of claim 1, wherein the guiding portion includes a surface which is rotationally symmetrical with respect to the axis of symmetry of the air spring.

4. The air spring of claim 1, wherein the at least one guiding portion includes a plurality of partial surfaces, and wherein the plurality of partial surfaces, with respect to the axis of symmetry of the air spring, are arranged substantially at the same circumferential angle distance relative to one another.

5. The air spring of claim 1, wherein the first angle of the curveless partial portion is between about 20° and about 50°.

6. The air spring of claim 5, wherein the first angle of the curveless partial portion is between about 35° and about 45°.

7. The air spring of claim 1, wherein the at least one guiding portion extends over a range of between about 10° and about 40°, of a radially expanding surface of the plunger piston.

8. The air spring of claim 7, wherein the at least one guiding portion extends over a range of between about 15° and about 35° of a radially expanding surface of the plunger piston.

9. The air spring of claim 8, wherein the at least one guiding portion extends over a range of between about 20° and about 30° of a radially expanding surface of the plunger piston.

10. The air spring of claim 1, wherein at least a portion of the cover radially inward from the at least one guiding portion includes a substantially planar surface.

11. The air spring of claim 1, wherein at least a portion of the cover radially inward from the at least one guiding portion includes a concave surface.

12. An air spring for a commercial vehicle, comprising:
    a plunger piston, an air bellows, and a cover;
    wherein the air bellows is movable between a first compressed position and a second extended position by compressing and extending movements, respectively;
    wherein the air bellows has an axle-side region with a fixing portion for fixing on the plunger piston, and a body-side region;
    wherein the fixing portion is fixed between the cover and the plunger piston;
    wherein the cover includes a circumferential edge having at least one guiding portion having a radial outermost end, the guiding portion extending away from the body-side region and outwards beyond the fixing portion and including a support for the axle-side region, and wherein the outward extending portion of the guiding portion ends at a rounding portion;
    wherein the fixing portion of the air bellows in the first compressed position and the second extended position of the air bellows is directed diagonally downwards;
    wherein the plunger piston includes an upper side having an inclined surface with a substantially planar portion which at least partially corresponds to the at least one guiding portion so that at least a portion of the guiding portion and the substantially planar portion of the inclined surface are at least substantially parallel to one another, and wherein the at least one guiding portion does not extend substantially directly vertically downward between the substantially planar portion and the radial outermost end, and wherein the inclined the surface of the upper side of the plunger piston and the axle side region of the air bellows all extend in a diagonal downward direction past the rounding of the guiding portion; and
    wherein the at least one guiding portion includes a curveless partial portion which is arranged at a first angle of between about 20° and about 50° with respect to an axis of symmetry of the air spring.

13. An air spring for a commercial vehicle, comprising:
    a plunger piston, an air bellows, and a cover;
    wherein the air bellows is movable between a first compressed position and a second extended position by compressing and extending movements, respectively;
    wherein the air bellows has an axle-side region with a fixing portion for fixing on the plunger piston, and a body-side region;
    wherein the fixing portion is fixed between the cover and the plunger piston;

wherein the cover includes a circumferential edge having at least one guiding portion having a radial outermost end, the guiding portion extending away from the body-side region and outwards beyond the fixing portion and including a support for the axle-side region; wherein the outward extending portion of the guiding portion ends at a rounding portion;

wherein the fixing portion of the air bellows in the first compressed position and the second extended position of the air bellows is directed diagonally downwards;

wherein the plunger piston includes an upper side having an inclined surface with a substantially planar portion which at least partially corresponds to the at least one guiding portion so that at least a portion of the guiding portion and the substantially planar portion of the inclined surface are at least substantially parallel to one another, and wherein the inclined the surface of the upper side of the plunger piston and the axle side region of the air bellows all extend in a diagonal downward direction past the rounding of the guiding portion; and wherein the at least one guiding portion includes a curve-less partial portion which is arranged at a first angle of between about 20° and about 70° with respect to an axis of symmetry of the air spring.

* * * * *